(12) United States Patent
Jin et al.

(10) Patent No.: US 12,482,482 B2
(45) Date of Patent: Nov. 25, 2025

(54) STUDIO QUALITY AUDIO ENHANCEMENT

(71) Applicants: Adobe Inc., San Jose, CA (US); The Trustees of Princeton University, Princeton, NJ (US)

(72) Inventors: Zeyu Jin, San Francisco, CA (US); Jiaqi Su, Princeton, NJ (US); Adam Finkelstein, Princeton, NJ (US)

(73) Assignees: Adobe Inc., San Jose, CA (US); The Trustees of Princeton University, Princeton, NJ (US)

( * ) Notice: Subject to any disclaimer, the term of this patent is extended or adjusted under 35 U.S.C. 154(b) by 314 days.

(21) Appl. No.: 18/191,763

(22) Filed: Mar. 28, 2023

(65) Prior Publication Data

US 2024/0331720 A1  Oct. 3, 2024

(51) Int. Cl.

| | |
|---|---|
| *G10L 21/034* | (2013.01) |
| *G06N 5/022* | (2023.01) |
| *G10L 21/0232* | (2013.01) |
| *G10L 21/0364* | (2013.01) |
| *G10L 25/18* | (2013.01) |
| *G10L 25/24* | (2013.01) |
| *G10L 25/60* | (2013.01) |
| G10L 25/30 | (2013.01) |

(52) U.S. Cl.
CPC ............ *G10L 21/034* (2013.01); *G06N 5/022* (2013.01); *G10L 21/0232* (2013.01); *G10L 25/18* (2013.01); *G10L 25/24* (2013.01); *G10L 25/60* (2013.01); *G10L 21/0364* (2013.01); *G10L 25/30* (2013.01)

(58) Field of Classification Search
CPC .............. G10L 21/034; G10L 21/0232; G10L 21/0364
See application file for complete search history.

(56) References Cited

U.S. PATENT DOCUMENTS

| | | |
|---|---|---|
| 10,770,063 B2 | 9/2020 | Jin et al. |
| 11,514,925 B2 | 11/2022 | Jin et al. |
| 11,985,179 B1 | 5/2024 | Tacer et al. |
| 12,272,371 B1 * | 4/2025 | Giri ......................... G10L 21/02 |
| 2002/0138268 A1 | 9/2002 | Gustafsson |
| 2020/0243102 A1 | 7/2020 | Schmidt et al. |
| 2021/0166717 A1 | 6/2021 | Wen et al. |
| 2021/0343305 A1 * | 11/2021 | Jin ....................... G10L 21/0364 |
| 2022/0223162 A1 | 7/2022 | Assael et al. |
| 2023/0110255 A1 | 4/2023 | Chen et al. |

(Continued)

OTHER PUBLICATIONS

Nguyen, Q. T., & Bui, T. D. (2016). Speech classification using SIFT features on spectrogram images. Vietnam Journal of Computer Science, 3, 247-257.*

(Continued)

*Primary Examiner* — Bryan S Blankenagel
(74) *Attorney, Agent, or Firm* — Nicholson De Vos Webster & Elliott LLP

(57) ABSTRACT

Embodiments are disclosed for converting audio data to studio quality audio data. The method includes obtaining an audio data having a first quality for conversion to studio quality audio. A first machine learning model predicts a set of acoustic features. A spectral mask is applied to the audio data during the prediction of the set of acoustic features. A second machine learning model generates studio quality audio from the set of acoustic features and the audio data.

19 Claims, 9 Drawing Sheets

(56) References Cited

U.S. PATENT DOCUMENTS

| | | | |
|---|---|---|---|
| 2023/0260530 A1* | 8/2023 | Strauss | G10L 21/0264 704/202 |
| 2023/0326476 A1* | 10/2023 | Andreev | G06N 3/0464 |
| 2024/0304203 A1* | 9/2024 | Joshi | G10L 25/51 |

OTHER PUBLICATIONS

Park, S. W., Kim, D. Y., & Joe, M. C. (2020). Cotatron: Transcription-guided speech encoder for any-to-many voice conversion without parallel data. arXiv preprint arXiv:2005.03295.*

Su, J. (2022). Studio-Quality Speech Enhancement. Princeton University.*

Notice of Allowance, U.S. Appl. No. 17/534,221, Oct. 1, 2024, 13 pages.

Bachhav et al., "Artificial Bandwidth Extension Using Conditional Variational Auto-encoders and Adversarial Learning," ICASSP 2020-2020 IEEE International Conference on Acoustics, Speech and Signal Processing (ICASSP), Apr. 2020, pp. 6924-6928.

Bachhav et al., "Efficient Super-Wide Bandwidth Extension Using Linear Prediction Based Analysis-Synthesis," ICASSP 2018-2018 IEEE International Conference on Acoustics, Speech and Signal Processing (ICASSP), Apr. 2018, pp. 1-5.

Bansal et al., "Bandwidth Expansion of Narrowband Speech Using Non-Negative Matrix Factorization," INTERSPEECH 2005—Eurospeech, 9th European Conference on Speech Communication and Technology, Sep. 4-8, 2005, pp. 1-6.

Binkowski et al., "High Fidelity Speech Synthesis with Adversarial Networks," arXiv:1909.11646v2 [cs. SD] Sep. 26, 2019, pp. 1-15.

Cao et al., "CREMA-D: Crowd-sourced Emotional Multimodal Actors Dataset", IEEE Transactions on Affective Computing, 5(4), 2014, pp. 377-390.

Chen et al., "Continuous Speech Separation with Conformer", arXiv:2008.05773v2 [eess.AS], Oct. 2020, 5 pages.

Choi et al., "Phase-aware Single-stage Speech Denoising and Dereverberation with U-Net", arXiv:2006.00687v1 [eess.AS], Jun. 1, 2020, 5 pages.

Defossez et al., "Real Time Speech Enhancement in the Waveform Domain", arXiv:2006.12847v3 [eess.AS], Sep. 6, 2020, 5 pages.

Donahue et al., "Exploring Speech Enhancement with Generative Adversarial Networks For Robust Speech Recognition", IEEE International Conference on Acoustics, Speech and Signal Processing, arXiv:1711.05747v2 [cs.SD], Oct. 2018, 6 Pages.

Eaton et al., "Estimation of room acoustic parameters: The ACE Challenge", IEEE/ACM TASLP, 24(10), Jun. 2016, pp. 1681-1693.

Eskimez et al., "Adversarial Training for Speech Super-Resolution," IEEE Journal of Selected Topics in Signal Processing, Apr. 2019, pp. 1-12.

Feng et al., "Learning Bandwidth Expansion Using Perceptually-motivated Loss," ICASSP 2019-2019 IEEE International Conference on Acoustics, Speech and Signal Processing (ICASSP), Apr. 2019, pp. 606-610.

Fu et al., "MetricGAN: Generative Adversarial Networks based Black-box Metric Scores Optimization for Speech Enhancement", Proceedings of the 36th International Conference on Machine Learning, 2019, 11 pages.

Gulati et al., "Conformer: Convolution-augmented Transformer for Speech Recognition", arXiv:2005.08100v1 [eess.AS], May 2020, 5 pages.

Gupta et al., "Speech Bandwidth Extension with Wavenet," arXiv:1907.04927v1 [eess.AS], Jul. 2019, pp. 1-4.

Han et al., "Learning spectral mapping for speech dereverberation and denoising.", 2014 IEEE International Conference on Acoustics, Speech and Signal Processing (ICASSP), 2014, pp. 4661-4665.

Hao et al., "Fullsubnet: A full-band and sub-band fusion model for real-time single-channel speech enhancement", arXiv:2010.15508v2 [eess.AS], Jan. 2021, 5 pages.

Hu et al., "DCCRN: Deep Complex Convolution Recurrent Network for Phase-Aware Speech Enhancement", arXiv:2008.00264v4 [eess.AS], Sep. 2020, 5 pages.

Isik et al., "PoCoNet: Better Speech Enhancement with Frequency-Positional Embeddings, Semi-Supervised Conversational Data, and Biased Loss", arXiv:2008.04470v1 [eess.AS], Aug. 2020, 5 pages.

Jax et al., "Artificial bandwidth extension of speech signals using MMSE estimation based on a hidden Markov model," 2003 IEEE International Conference on Acoustics, Speech, and Signal Processing, (ICASSP '03), Apr. 2003, pp. 1-680-1-683.

Jin et al., "FFTNet: A Real-Time Speaker-Dependent Neural Vocoder," 2018 IEEE International Conference on Acoustics, Speech and Signal Processing (ICASSP), Apr. 2018, pp. 2251-2255.

Kameoka et al., "StarGAN-VC: Non-parallel many-to-many voice conversion with star generative adversarial networks," arXiv:1806.02169v2 [cs.SD], Jun. 2018, pp. 1-9.

Kinoshita et al., "The reverb challenge: A common evaluation framework for dereverberation and recognition of reverberant speech", IEEE Workshop on Applications of Signal Processing to Audio and Acoustics, Oct. 20-23, 2013, 4 pages.

Koizumi et al., "Df-conformer: Integrated architecture of conv-tasnet and conformer using linear complexity self-attention for speech enhancement", In 2021 IEEE Workshop on Applications of Signal Processing to Audio and Acoustics (WASPAA), Oct. 17-20, 2021, arXiv:2106.15813v2 [eess.AS], 5 pages.

Kuleshov et al., "Audio Super Resolution using Neural Networks." ICLR 2017, arXiv:1708.00853v1 [cs.SD], Aug. 2017, pp. 1-8.

Kumar et al., "MelGAN: Generative Adversarial Networks for Conditional Waveform Synthesis," 33rd Conference on Neural Information Processing Systems (NeurIPS 2019), arXiv:1910.06711v3 [eess.AS], Dec. 2019, pp. 1-14.

Li et al., "A Deep Neural Network Approach To Speech Bandwidth Expansion", 2015 IEEE International Conference on Acoustics, Speech and Signal Processing (ICASSP), 2015, pp. 4395-4399.

Li et al., "Speech Audio Super-Resolution For Speech Recognition," INTERSPEECH 2019, Sep. 2019, pp. 3416-3420.

Li et al., "Speech Bandwidth Extension Using Generative Adversarial Networks", 2018 IEEE International Conference on Acoustics, Speech and Signal Processing (ICASSP), 2018, pp. 5029-5033.

Ling et al., "Waveform Modeling and Generation Using Hierarchical Recurrent Neural Networks for Speech Bandwidth Extension," arXiv:1801.07910v1 [cs.SD], Jan. 2018, pp. 1-11.

Macartney et al., "Improved Speech Enhancement with the Wave-U-Net", arXiv:1811.11307v1 [cs. SD], Nov. 2018, 5 pages.

Mack et al., "Single-Channel Dereverberation Using Direct MMSE Optimization and Bidirectional LSTM Networks", Proc. Interspeech, Sep. 2-6, 2018, 5 pages.

Maiti et al., "Speaker independence of neural vocoders and their effect on parametric resynthesis speech enhancement", In ICASSP 2020-2020 IEEE International Conference on Acoustics, Speech and Signal Processing (ICASSP), Nov. 2019, arXiv:1911.06266v1 [cs.SD], 5 pages.

Manocha et al., "A differentiable perceptual audio metric learned from just noticeable differences", Proc. Interspeech 2020, arXiv:2001.04460v2, 6 pages.

Mittag et al., "NISQA: A Deep CNN-Self-Attention Model for Multidimensional Speech Quality Prediction with Crowdsourced Datasets," arXiv:2104.09494v1 [eess.AS], Apr. 2021, 5 pages.

Mysore et al., "Can we Automatically Transform Speech Recorded on Common Consumer Devices in Real-World Environments into Professional Production Quality Speech ?—A Dataset, Insights, and Challenges," IEEE Signal Processing Letters, vol. 22, No. 8, Aug. 2015, pp. 1006-1010.

Nagrani et al., "VoxCeleb: a large-scale speaker identification dataset", Proc. Interspeech, May 2018, 6 pages.

Non-Final Office Action, U.S. Appl. No. 17/534,221, Oct. 26, 2023, 11 pages.

Panayotov et al., "Librispeech: an asr corpus based on public domain audio books", IEEE International Conference on Acoustics, Speech and Signal Processing, 2015, 5 pages.

Pascual et al., "Towards Generalized Speech Enhancement with Generative Adversarial Networks", Proc. Interspeech, 2019, arXiv:1904.03418v1 [cs.SD], 5 pages.

(56) References Cited

OTHER PUBLICATIONS

Pascual et al., "SEGAN: Speech Enhancement Generative Adversarial Network," arXiv:1703.09452v3 [cs.LG], Jun. 2017, pp. 1-5.
Polyak et al., "High fidelity speech regeneration with application to speech enhancement", arXiv:2102.00429v1 [cs.SD], Jan. 2021, 5 pages.
Qian et al., "F0-consistent many-to-many non-parallel voice conversion via conditional autoencoder," ICASSP, arXiv:2004.07370v1 [eess.AS], Apr. 2020, 5 pages.
Reddy et al., "The INTERSPEECH 2020 Deep Noise Suppression Challenge: Datasets, Subjective Speech Quality and Testing Framework", INTERSPEECH 2020, 5 pages.
Rethage et al., "A Wavenet for Speech Denoising", IEEE International Conference on Acoustics, Speech and Signal Processing (ICASSP), arXiv:1706.07162v3 [cs.SD], Jan. 2018, 11 pages.
Salimans et al., "Weight Normalization: A Simple Reparameterization to Accelerate Training of Deep Neural Networks," arXiv:1602.07868v3 [cs.LG], Jun. 2016, pp. 1-11.
Schmidt et al., "Blind Bandwidth Extension Based on Convolutional and Recurrent Deep Neural Networks," 2018 IEEE International Conference on Acoustics, Speech and Signal Processing (ICASSP), 2018, pp. 5444-5448.
Seetharaman et al., "VoiceAssist: Guiding Users to High-Quality Voice Recordings", ACM CHI 2019, May 4-9, 2019, 6 pages.
Seo et al. "A maximum a Posterior-based reconstruction approach to speech bandwidth expansion in noise," 2014 IEEE International Conference on Acoustics, Speech and Signal Processing (ICASSP), May 2014, pp. 6128-6132.
Shen et al., "Natural TTS Synthesis by Conditioning WaveNet on Mel Spectrogram Predictions", In 2018 IEEE international conference on acoustics, speech and signal processing (ICASSP), arXiv:1712.05884v2 [cs.CL], Feb. 2018, 5 pages.
Su et al., "Bandwidth extension is all you need", IEEE International Conference on Acoustics, Speech and Signal Processing (ICASSP), 2021, pp. 696-700.
Su et al., "Perceptually-Motivated Environment-Specific Speech Enhancement", In ICASSP 2019 IEEE International Conference on Acoustics, Speech and Signal Processing, Apr. 2019, pp. 7015-7019.
Su et al., "HiFi-GAN: High-Fidelity Denoising and Dereverberation Based on Speech Deep Features in Adversarial Networks," INTERSPEECH 2020, Oct. 2020, pp. 4506-4510.
Tan et al., "Learning Complex Spectral Mapping with Gated Convolutional Recurrent Networks for Monaural Speech Enhancement", IEEE/ACM Trans Audio Speech Lang Process, 2020, 34 pages.
Traer et al., "Statistics of natural reverberation enable perceptual separation of sound and space", Proceedings of the National Academy of Sciences, Nov. 2016, pp. E7856-E7865.
Van Den Oord et al., "WaveNet: A Generative Model for Raw Audio," arXiv:1609.03499v2 [cs.SD], Sep. 2016, pp. 1-15.
Vaswani et al., "Attention Is All You Need", 31st Conference on Neural Information Processing Systems (NIPS2017), 2017, 11 pages.
Wang et al., "Speech Super-Resolution Using Parallel WaveNet," 2018 11th International Symposium on Chinese Spoken Language Processing (ISCSLP), Nov. 2018, pp. 260-264.
Wang et al., "Time-Frequency Loss for CNN Based Speech Super-Resolution," ICASSP 2020-2020 IEEE International Conference on Acoustics, Speech and Signal Processing (ICASSP), Apr. 2020, pp. 861-865.
Williamson et al., "Speech dereverberation and denoising using complex ratio masks", In Acoustics, Speech and Signal Processing (ICASSP), 2017, pp. 5590-5594.
Xu et al., "A regression approach to speech enhancement based on deep neural networks", IEEE/ACM Transactions on Audio, Speech and Language Processing (TASLP), 23(1), Jan. 2015, pp. 7-19.
Final Office Action, U.S. Appl. No. 17/534,221, Jun. 5, 2024, 14 pages.

* cited by examiner

700

RECEIVING A COLLECTION OF TRAINING DATA INCLUDING TRAINING STUDIO QUALITY AUDIO DATA, TRAINING INPUT AUDIO DATA, AND A SET OF TRAINING ACOUSTIC FEATURES 702

TRAINING A FIRST MACHINE LEARNING MODEL USING THE COLLECTION OF TRAINING DATA INCLUDING TRAINING STUDIO QUALITY AUDIO DATA, TRAINING INPUT AUDIO DATA, AND A SET OF TRAINING ACOUSTIC FEATURES TO GENERATE A SET OF ACOUSTIC FEATURES FOR THE INPUT AUDIO DATA THAT REPRESENT A PREDICTED SET OF ACOUSTIC FEATURES FOR STUDIO QUALITY AUDIO 704

*FIG. 7*

STUDIO QUALITY AUDIO ENHANCEMENT

BACKGROUND

In the field of audio recording, the quality of audio capture devices varies widely from low quality voice recording to high quality microphones, audio processors, and complex systems. The quality of recording is influenced by environmental factors such as background noise and microphone quality that can result in an undesirable audio quality.

In one existing technique, a neural network predicts an enhanced output audio from a source audio recording. A loss function is used to represent a comparison between the predicted audio output by the neural network and target audio that is the desired output generated from the source audio recording. For example, if the neural network was trained to remove a type of noise from a source audio recording, then the neural network is able to reduce noise in the source audio by generating predicted enhanced output audio.

SUMMARY

Introduced here are techniques/technologies that relate to generating high or studio quality audio from an input audio data having a first quality that is less than high or studio quality. To generate studio quality audio, a predicted set of acoustic features is generated that represents acoustic features that correspond to a studio quality version of the input audio data. The predicted set of acoustic features includes multiple values of Mel-Frequency Cepstral Coefficients that are the top DCT coefficients of the log Mel-spectrogram which encode key information of the audio data with a perceptual scale that approximates a human auditory response. The predicted set of acoustic features are generated by an acoustic feature prediction network from the input audio data. Using the predicted set of acoustic features and the input audio data, a machine learning model generates studio quality audio.

More specifically, in one or more embodiments, a new transformer architecture of an acoustic feature prediction model that includes a spectral masking function is used to predict a set of studio quality acoustic features that are free of perceptual artifacts. The predicted set of studio quality acoustic features are used by a generative audio model to generate studio quality audio output.

Additional features and advantages of exemplary embodiments of the present disclosure will be set forth in the description which follows, and in part will be obvious from the description, or may be learned by the practice of such exemplary embodiments.

BRIEF DESCRIPTION OF THE DRAWINGS

The detailed description is described with reference to the accompanying drawings in which:

FIG. 7 illustrates a flowchart of a series of acts in a method of training an acoustic feature prediction network in accordance with one or more embodiments;

DETAILED DESCRIPTION

Figure 1:
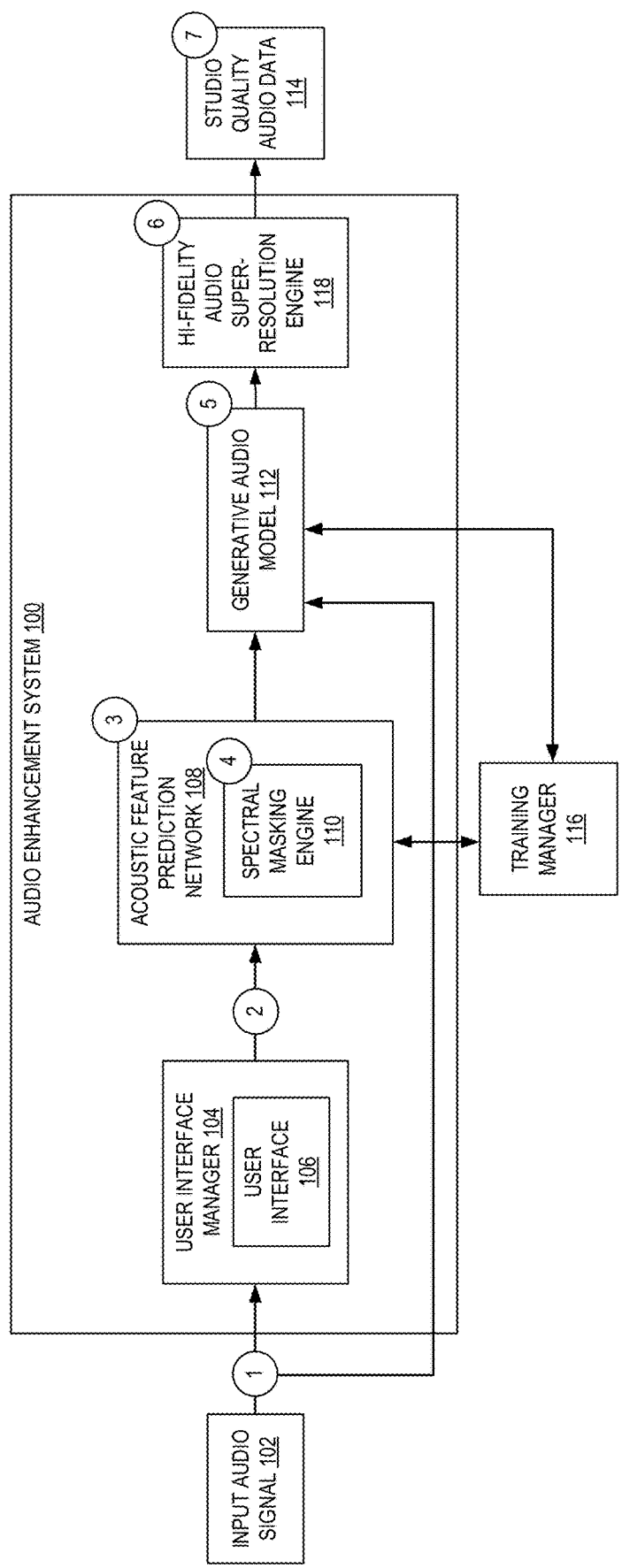
FIG. 1 illustrates a diagram of a process of generating studio quality audio from an audio data with a first quality in accordance with one or more embodiments.

One or more embodiments of the present disclosure include an audio enhancement system including an acoustic feature prediction network and machine learning model that generates high or studio quality audio from lower quality audio data. Audio and speech enhancement methods typically focus on alleviating severe noise and reverberation from recordings and improving intelligibility of speech content for downstream tasks, such as speech recognition. As audio content is increasingly generated in diverse environments, the audio quality of that content (e.g., podcasts, video voice-overs, and audio books) greatly varies, from consumer grade recordings (which suffer from moderate noise, reverb, and EQ distortion) to professional studio quality. This has led to increased demand to improve the audio quality of consumer grade recordings to more closely resemble that of studio quality recordings.

Typical methods enhance audio by learning a non-linear spectral mapping that estimates the target spectrogram from the input spectrogram. Other existing methods include using a binary or ratio mask over the input magnitude spectrogram that separates out speech as foreground from background sound. However, these spectral methods require performing an inverse short-time Fourier transform (STFT) process to recover waveforms. The STFT process introduces undesirable audible artifacts (e.g., popping, cracking, noise, etc.) due to missing or mismatching phase information. Some techniques attempt to predict phase along with the spectrogram, but these techniques are limited because phase information is much more arbitrary than input magnitude.

Still other approaches focus on enhancement directly in the waveform of the audio data to avoid information loss or phase inversion; yet designing proper networks is still a challenge since waveform has high resolution and dense temporal structures. Some of these waveform methods detect complex patterns in the waveforms. Existing enhancement methods have shown significant audio quality improvement, especially for hard denoising cases with low signal to noise rations (SNRs). However, these methods are commonly trained using datasets that are inadequate for training a model for high or studio quality audio conversion. Additionally, these models are not trained to address environmental conditions matching typical consumer-grade recording environments, which limits their usability for noisy audio data. As a result, the results of using existing audio enhancement techniques do not result in studio-quality output audio.

In other approaches, generative adversarial networks (GANs) have been widely used to produce high fidelity audio in speech processing and generation. GANs have been used on spectral features as well as on waveforms. GANs produce high fidelity results by applying discrimination in both the time domain and the time-frequency domain. Another approach performs speech enhancement by re-synthesis, given recent success in high-fidelity speech synthesis. Using this approach, speech features are extracted from the input audio and re-synthesized to a clean waveform using neural vocoders. However, the quality of this approach is limited by the quality of vocoders, as most do not generalize well across speakers and tend to generate "robotic" voices. This approach is also susceptible to inaccurately estimated speech features, leading to speech content distortion and unnatural rhythmic patterns. As discussed above, conventional techniques have ambiguity on speaker identity and speech content, and lack the ability to handle many environmental effects and external audio context (e.g., ambient environments for all speakers). As a result, conventional systems produce output that includes distortions.

To address these and other deficiencies in conventional systems, embodiments apply machine learning to generate spectral features to guide the enhancement of the audio data. By generating the spectral features to guide the waveform generation, embodiments avoid distortion of speaker identity and speech content by improving the acoustic feature prediction model. As a result, an audio enhancement application uses the entire input audio sequence including both the raw waveform and spectral features to generate studio quality audio data.

FIG. 1 illustrates a diagram of a process of generating studio quality audio from an audio data with a first quality in accordance with one or more embodiments. As depicted in FIG. 1, an audio enhancement system 100 includes a user interface manager 104, an acoustic feature prediction network 108, and a generative audio model 112. The computing environment includes a user interface 106 that receives an input 102. In some embodiments, the acoustic feature prediction network 108 is implemented as a module in the audio enhancement system 100 or another computing application.

At numeral 1, the audio enhancement system 100 obtains an input 102 from a user by using the user interface 106. The input 102 includes audio data (e.g., an audio data, an audio stream, etc.) having a first quality that includes at least one perceptual difference from high or studio quality audio. High quality in this context may refer to audio data which includes speech content that free from noise or other artifacts and sounds natural and clear to an observer using mean opinion score (MOS) or similar metric. Studio quality means that the audio is recorded and professionally edited in an anechoic studio, at a sample rate ≥44.1 kHz or audio that is perceptually indistinguishable using mean opinion score (MOS) or similar metric. Although embodiments are generally described with respect to generating studio quality audio from lower quality audio, embodiments may generally be used to generate high quality audio or studio quality audio from lower quality audio. The input 102 may identify an audio data that is stored by the computing system or otherwise accessible. An example of the input 102 includes a file name, a uniform resource link, or other identifier.

At numeral 2, the acoustic feature prediction network 108 receives the audio data identified by the input 102. The audio data includes a log-Mel spectrogram that represents a collection of sound that includes at least one perceptual difference from studio quality. The log-Mel spectrogram is computed by the audio enhancement system 100 as pre-processing before acoustic feature prediction network. The perceptual difference is a degradation (e.g., a pop, crackling, audio artifact, etc.) of the audio quality that is intended to be removed by the audio enhancement system 100 (e.g., the acoustic feature prediction network 108 and the generative audio model 112).

At numeral 3, the acoustic feature prediction network 108 generates a predicted Mel-spectrogram that represent studio quality acoustic features of the audio data identified by the input 102. In some embodiments, the acoustic feature prediction network is a transformer network that predicts a Mel-spectrogram of studio quality audio from a noisy reverberant audio input, which is represented by an input Mel-Spectrogram. The Mel-spectrogram uses a scale of pitches (e.g., Mel scale) that human hearing generally perceives to be equally spaced from each other. To obtain the input Mel-spectrogram, the acoustic feature prediction network 108 pre-processes the input 102 using short-time Fourier Transforms and applies a set of triangular filters that are spaced using Mel scale as described above. A logarithm function is applied to the Mel-spectrogram to produce a log Mel-spectrogram.

In some embodiments, the acoustic feature prediction network 108 is a transformer network. The transformer network includes a combination of multi-head self-attention layers, linear projection layers, dilative convolutional layers, and non-linear activation functions. A self-attention layer captures relationships between different positions of the input sequence, and computes a sequence of the same length with each position being a learnt vector that aggregates information from the input sequence. "Multi-head" means use of multiple attention heads so that the self-attention mechanism is able to capture multiple types of such relationships. Each linear projection layer transforms an input (e.g., a kernel) having a first dimension size into an output having a second dimension size. Each dilative convolutional layer expands its kernel by inserting spaces between the consecutive kernel elements. Such a method enables covering a larger span of input (i.e., a larger receptive) without adding computation cost, in comparison to traditional convolutional layers. Using dilative convolutional layer improves learning long temporal context. For example, a dilative convolutional layer with a factor of 2 expands a kernel size of 5 to a kernel size of 10. The transformer network applies the combination of layers to generate the predicted set of acoustic features.

In an example, the acoustic feature prediction network 108 receives the input log Mel-spectrogram of the input audio as part of the audio data. The acoustic feature prediction network 108 predicts a Mel-spectrogram, representing studio quality audio, that is the same size as the input log Mel-spectrogram.

At numeral 4, the acoustic feature prediction network 108 applies a spectral masking engine 110 to the Mel-spectrogram of the input audio signal 202. The spectral masking engine 110 generates a non-negative mask from the input Mel-spectrogram and applies the non-negative mask to the input Mel-spectrogram. In some embodiments, the predicted non-negative mask is multiplied with the input log Mel-spectrogram by the acoustic feature prediction network 108. The acoustic feature prediction network 108 can pre-process the input log Mel-spectrogram to include values that are normalized to a range of [0, 1]. By performing the multiplication of the input log Mel-spectrogram and the non-negative mask, the acoustic feature prediction network reduces or eliminates the energy of un-desirable characteristics (e.g., noise, reverberation) in the time-frequency space, while preserving or scaling-up the energy of desired speech. Applying this approach results in an output Mel-spectrogram that more closely resembles a studio quality version of the input audio data. The acoustic feature prediction network 108 applies a post-net after the spectral masking engine 110. The output of the post-net is the final output of the acoustic feature prediction network.

After combining (e.g., by multiplication) the non-negative mask and the input Mel-spectrogram, the acoustic feature prediction network outputs a Mel-spectrogram that is the same size as the input Mel-spectrogram. In some embodiments, the output Mel-spectrogram can be converted by MFCC converter 210 to MFCCs for input into the generative audio model 112.

At numeral 5, the generative audio model 112 generates audio waveforms that correspond to perceptual sound using the input audio signal 102 and the MFCCs from the predicted Mel-spectrogram output from the acoustic feature prediction network 108. In some embodiments, the generative audio model 112 is a generative adversarial network (GAN) that is trained to enhance audio data that include various speakers, speech content, and various environmental conditions. During training, the generative audio model 112 learns to map training input audio data and a training set of acoustic features to a training studio quality audio data. The generative audio model 112 uses the set of predicted acoustic features as references for the acoustic features of the audio waveform being generated. Additional details on the generative adversarial network for generating output audio is described in U.S. patent application Ser. No. 16/863,591, which is incorporated by reference in its entirety.

In some embodiments, to train the GAN, a discriminator component learns to distinguish authentic studio quality audio data, such as the training studio quality audio data, from inauthentic target audios, such as output audio data produced by a generator component. The generator component learns to generate progressively better output audio data (i.e., closer to the corresponding training studio quality audio data) based in part on feedback from the discriminator component. More specifically, during training, the generator component produces output audio data from the noisy input audio data and the training set of acoustic features, and the discriminator component guesses whether the output audio and/or training studio quality audio data is authentic. Training of the GAN can use any suitable process and/or loss functions for training GANs. After training, the GAN is able to generate a studio quality audio based on an input audio data and a set of predicted acoustic features from the first machine learning model (e.g., acoustic feature prediction network).

At numeral 6, the audio enhancement system 100 applies a high-fidelity audio super resolution engine 118 to generate wideband audio data (e.g., 44 kHz or higher) from narrowband audio data (e.g., less than 44 kHz audio data). To implement the high-fidelity audio super resolution engine 118, the audio enhancement system 100 can use a generative adversarial network (GAN) to perform bandwidth extension (BWE) to extend the output speech of the generative audio model 112 from, e.g., 16 kHz to 48 kHz, such that the result is typically indistinguishable from real full bandwidth recordings. The audio super resolution engine can include a generator model and a plurality of discriminator models. The discriminator models include a spectrogram discriminator network and multiple waveform discriminator networks for the signal at different resolutions. Once trained, the generator model can be used to perform bandwidth extension on any arbitrary speech narrowband audio to obtain full band audio. Additional details of the high-fidelity audio super resolution engine 118 are described in U.S. patent application Ser. No. 17/534,221, which is incorporated by reference in its entirety.

At numeral 7, the high-fidelity audio super resolution engine 118 outputs the studio quality audio data 114. The high-fidelity audio super resolution engine 118 can output the studio quality audio data to an audio device (e.g., speaker) for presentation to the user, to the user interface 106 allowing a user to request a download, or a link to stream the studio quality audio data 114. This studio quality audio data can then be used in various audio editing applications that require high fidelity audio to avoid loss of audio quality.

The acoustic feature prediction network 108 and/or the generative audio model 112 can be trained by the training manager 116 as described in additional detail below. The training manager 116 can include, or have access to, training sets of acoustic features, training studio quality audio, and training input audio data.

Figure 2:
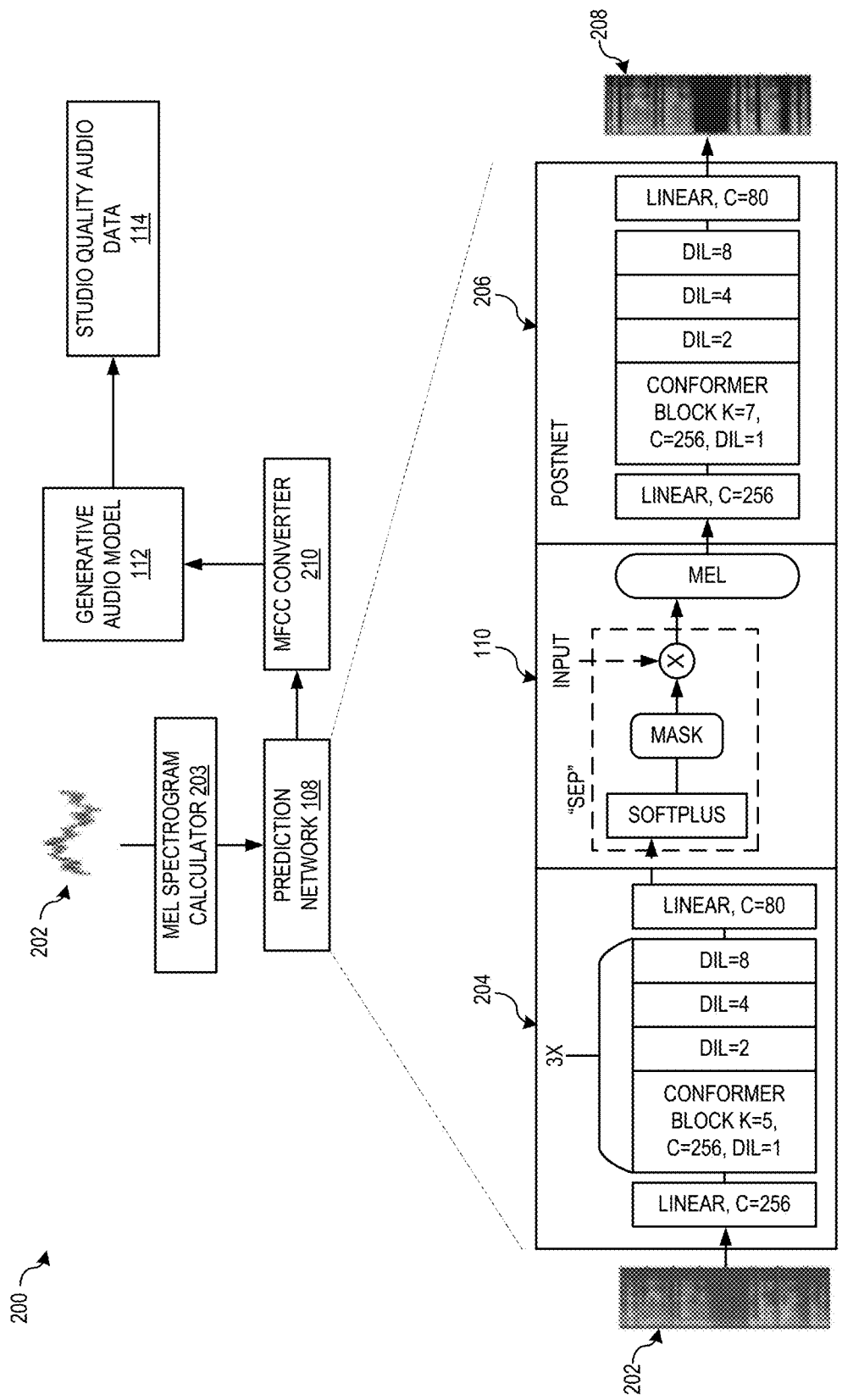
FIG. 2 illustrates an example of generating a set of acoustic features for the studio quality audio using spectral masking in accordance with one or more embodiments.

FIG. 2 illustrates an example of generating a set of acoustic features for the studio quality audio in accordance with one or more embodiments. As described with reference to FIG. 1, the acoustic feature prediction network 108 generates a predicted Mel spectrogram for computing the MFCCs to input to the generative audio model 112 for audio enhancement. A Mel spectrogram calculator 203 computes a Mel spectrogram from the input audio signal 202 prior to input to the acoustic feature prediction network 108. For example, the Mel spectrogram calculator 203 uses a short-time Fourier transform, applies triangular filters, and may perform other pre-processing steps to generate a Mel spectrogram for use as an input Mel spectrogram as described below.

In an example, the acoustic feature prediction network 108 receives input audio signal 202. As described with reference to FIG. 1, the acoustic feature prediction network 108 processes an input spectrogram representing the input audio signal 202 using pre-processing blocks 204 that include a linear projection layer, a set of conformer blocks, and a linear projection layer. A post-net of the acoustic feature prediction network 108 includes post-processing blocks 206 including a linear projection layer, a set of conformer blocks, and a linear projection layer. The acoustic feature prediction network 108 includes a spectral masking engine 110 that generates a spectral mask from the output of the pre-processing blocks 204. The acoustic feature prediction network 108 applies the spectral mask to the input Mel-spectrogram representing the input audio signal 202. The input Mel-spectrogram may be computed from input audio signal during preprocessing. By applying the spectral mask, the spectral masking engine 110 constrains the output of the acoustic feature prediction network 108 to a set of acoustic features that represent a studio quality audio version of the input audio signal 202.

In some embodiments, the conformer block as illustrated in FIG. 2 includes two Feedforward modules, each of which includes layer normalization, linear layers, a sigmoid linear unit (e.g., activation function), and other linear layers. The conformer block also includes multi-head self-attention layers as described above. Additional layers include normalization layers, linear layers, gated linear units (GLUs), dilative convolution layers, and batch normalization layers. The spectral masking engine 110 outputs the predicted Mel-spectrogram to the post-processing convolution blocks 206. The output of the post-processing convolution blocks 206 is the predicted Mel-spectrogram 208 that represents acoustic features corresponding to a studio quality version of the input audio signal 202. The predicted Mel-spectrogram can be converted to a set of MFCCs by MFCC converter 210 using Discrete Cosine Transform. The set of MFCCs and the input audio signal 202 are provided to the generative audio model 112. The generative audio model 112 generates a studio quality audio data 114 by generating audio waveforms using the input audio signal 202 and the MFCCs computed from the predicted Mel-spectrogram 208 as described above.

In some embodiments, the acoustic feature prediction network 108 selects a number of acoustic features to output to the generative audio model 112. For example, the acoustic feature prediction network 108 predicts a set of 18 coefficients for the predicted studio quality audio corresponding to the input audio data. Both the acoustic feature prediction network 108 and the MFCC converter 210 can have different configurations, in terms of the types of acoustic features used, the parameters for computing the acoustic features, and the number of coefficients selected. In the example depicted by FIG. 2, the acoustic feature prediction network 108 inputs and outputs 80-bin log Mel-spectrograms, and the MFCC converter 210 converts to 18-coefficient MFCCs. Both the number of bins and the number of MFCCs can be changed to other configurations. The number of coefficients predicted is configurable depending on the complexity of the input audio data, a pre-determined number, or a number learned during training that optimizes the predicted set of acoustic features compared to the training set of studio quality acoustic features. While the acoustic feature prediction network 108 is illustrated with a particular configuration and combination of layers, other combinations and additional or fewer layers are possible.

The acoustic feature prediction network 108 is trained utilizing the acoustic features of simulated noisy reverberant audio as input and studio quality audio as a target. During training, the acoustic feature prediction network 108 minimizes a loss function (e.g., mean squared error loss) for each acoustic feature and minimizes a difference between a value of each acoustic feature. Additional details of the training as described below with reference to FIG. 3.

Figure 3:
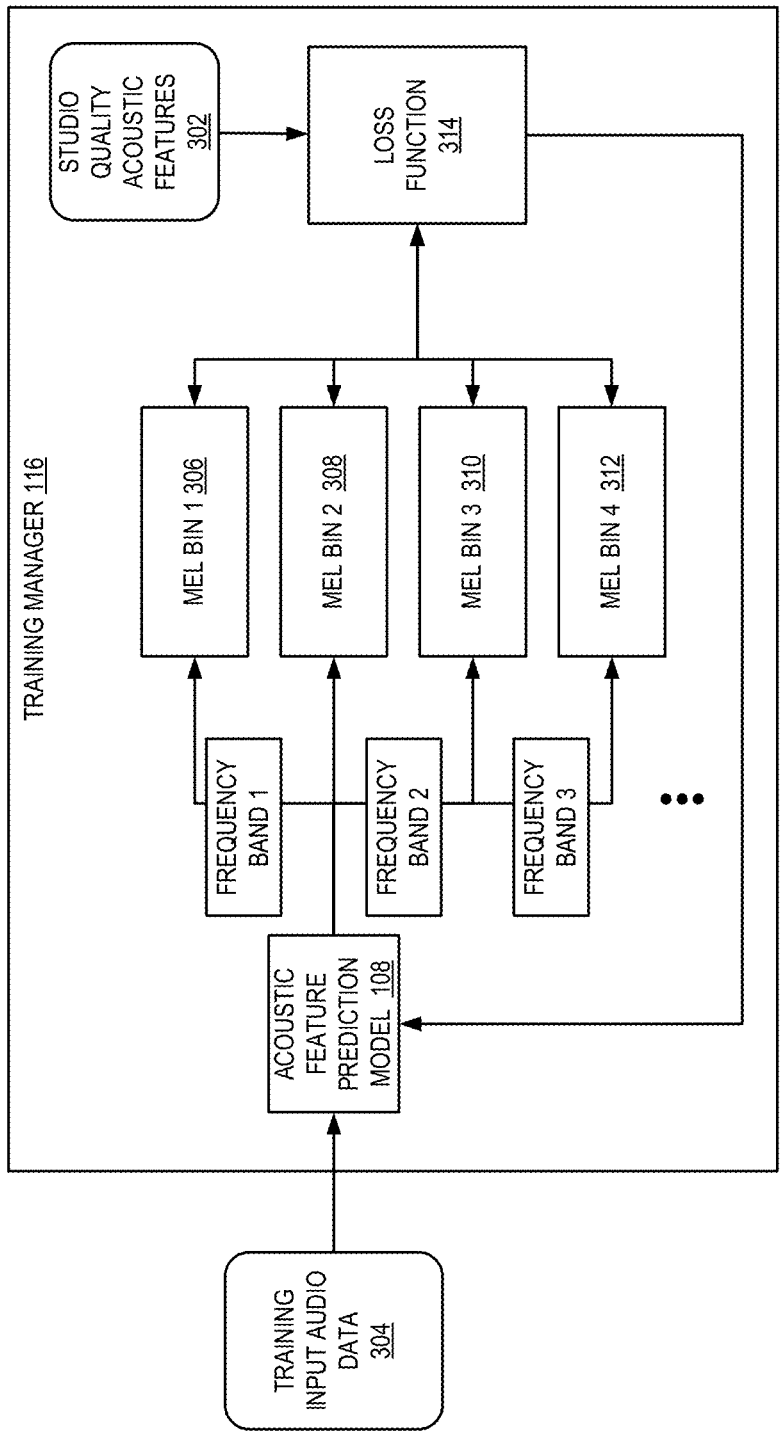
FIG. 3 depicts an example of training an acoustic feature prediction network in accordance with one or more embodiments.

FIG. 3 illustrates a diagram of training an acoustic feature prediction network in accordance with one or more embodiments. In various embodiments, training is performed using mean-squared error loss between a predicted acoustic feature and a studio quality acoustic feature. The predicted acoustic feature corresponds to the studio quality acoustic feature such as Mel-spectrogram, MFCC, etc. As a result of the training, the acoustic feature prediction network learns to generate a set of acoustic features (e.g., a Mel-spectrogram or Mel-frequency Cepstral Coefficients (MFCCs)) from noisy input audio data. While the description following describes Mel-spectrogram, it should be understood that the MFCCs can also be used. An audio waveform generated from the set of Mel spectrogram has a quality that approximates the waveforms generated from the studio quality acoustic features. The training minimizes the mean-squared error between a Mel spectrogram from the studio quality acoustic features and a corresponding Mel spectrogram generated by the acoustic feature prediction network. The training also optimizes for linear distance between Mel spectrogram from the studio quality acoustic features and a corresponding Mel spectrogram generated by the acoustic feature prediction network. As shown in FIG. 3, a training manager 116 can be responsible for training the acoustic feature prediction network 108. In various embodiments, the training manager 116 may be implemented as part of the audio enhancement system 100 or as part of a separate machine learning service or system which trains models that are then deployed to services and systems, such as the audio enhancement system 100.

The training manager 116 can include, or have access to, studio quality acoustic features 302 and training input audio data 304. The studio quality acoustic features 302 may include sets of acoustic features from studio quality audio data (e.g., from a professionally recorded dataset or otherwise obtained). In some embodiments, the training manager 116 can select a subset of features from the studio quality acoustic features 302 for use in training the acoustic feature prediction network 108.

As described above, the acoustic feature prediction network 108 generates a set of Mel-spectrogram that correspond to those of the training input audio data. A loss function 314 is applied to train the acoustic feature prediction network. For example, a distance function, such as L1 or L2 distance, computes a difference between each of the Mel-bins 306-312 and the studio quality acoustic features 302. The results of the loss functions 314 are then used to train the acoustic feature prediction network. Training may proceed over a number of epochs until the model has converged. Once trained, the acoustic feature prediction network can be deployed to the audio enhancement system to perform studio quality audio conversions on noisy and arbitrary audio input files. After deployment to the audio enhancement system, the audio enhancement system 100 can supply studio quality output audio to the training manager 116 to augment the training data by generating additional studio quality audio data and studio quality acoustic features.

In some embodiments, the training manager 116 performs retraining on the generative audio model 112 or the acoustic feature prediction network 108 using additional studio quality output files generated by the audio enhancement system. The additional studio quality audio data is generated by converting input audio data to studio quality output audio as described above. The additional training studio quality audio data can be used to generate augmented training data including additional training input audio data and additional training sets of acoustic features. After augmenting the training data, the training manager retrains the first machine learning model or the second machine learning model using the collection of training data including augmented training studio quality audio data, augmented training input audio data, and an augmented set of training acoustic features to generate studio quality audio for input audio data.

Figure 4:
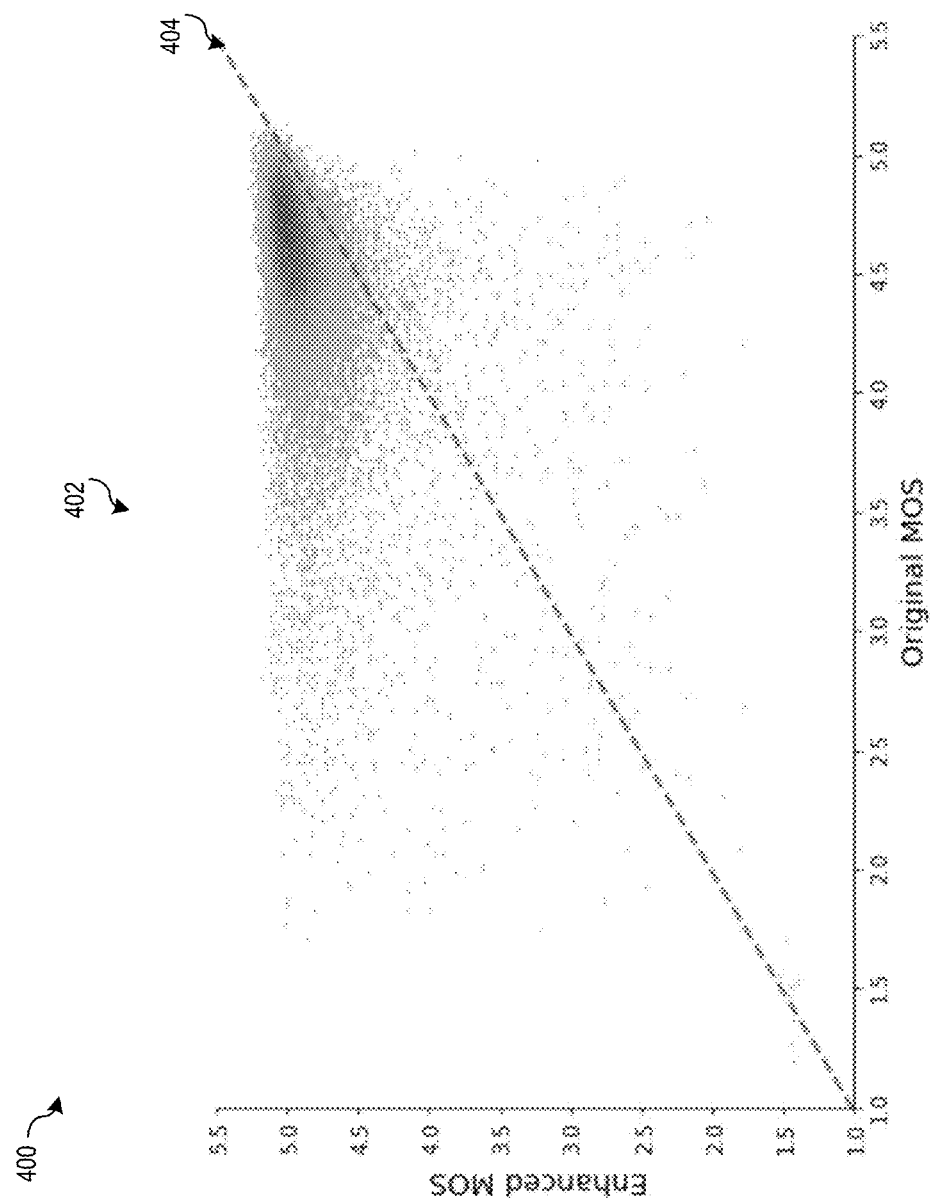
FIG. 4 illustrates an example comparison of perceptual results of different audio enhancement processes in accordance with one or more embodiments.

FIG. 4 illustrates an example of perceptual improvements in accordance with one or more embodiments. In particular, FIG. 4 illustrates a chart 402 that compares MOS scores before and after enhancements using techniques described herein. The line 404 indicates an equal MOS before and after. Accordingly, points above the line 404 represent improvement in the MOS score between the original MOS score of the input audio and the MOS score after being enhanced as described above.

To generate the chart 402, the Voice Cloning Toolkit (VCTK) dataset was input to the audio enhancement system 100 for conversion to studio quality output audio. The VCTK data set includes recordings of 109 speakers of English, each reading out around 400 sentences. These recordings, though mostly clean and clear, contain background noise and normal human speaking breath sounds. The VCTK dataset is processed as described above and recordings that exceed 4.3 in the enhanced MOS of audio quality (estimated by the no-reference instrument NISQA) are considered studio quality. The result is that 97% of the enhanced recordings exceed the 4.3 MOS. This outcome significantly increases the available training data on studio quality audio data.

Figure 5:
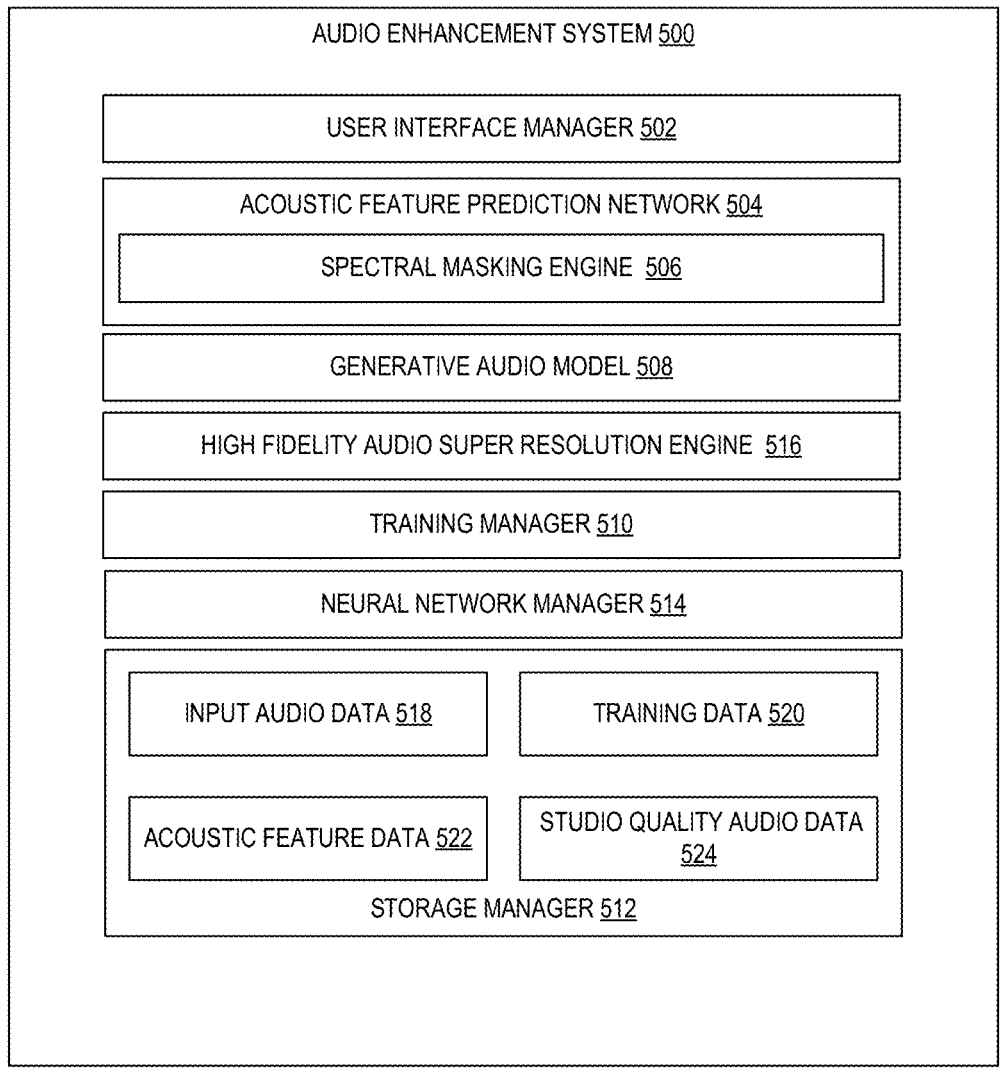
FIG. 5 illustrates a schematic diagram of an audio enhancement system in accordance with one or more embodiments.

FIG. 5 illustrates a schematic diagram of an audio enhancement system including an acoustic feature prediction network in accordance with one or more embodiments. As shown, the audio enhancement system 500 may include but is not limited to user interface manager 502, acoustic feature prediction network 504, generative audio model 508, training manager 510, and storage manager 512. The acoustic feature prediction network 504 includes spectral masking engine 506. The storage manager 512 includes input audio data 518, training data 520, acoustic feature data 522, and studio quality audio data 524.

As illustrated in FIG. 5, the audio enhancement system 500 includes a user interface manager 502. For example, the user interface manager 502 allows users to select audio data or record input to the audio enhancement system 500. In some embodiments, the user interface manager 502 provides a user interface through which the user can upload the audio data or start recording an audio data which has a first quality as discussed above. Alternatively, or additionally, the user interface manager 502 may enable the user to download the studio quality audio data 524 or acoustic feature data 522 from a local or remote storage location (e.g., by providing an address (e.g., a URL or other endpoint) associated with input audio data 518. In some embodiments, the user interface manager 502 can enable a user to link a library of input audio data 518 including multiple audio data for asynchronous conversion to studio quality audio by the audio enhancement system.

As illustrated in FIG. 5, the audio enhancement system 500 also includes an acoustic feature prediction network 504. The acoustic feature prediction network 504 receives the input audio data 518 and uses various neural network layers to predict a set of acoustic features. The set of acoustic features can be represented by a set of values for Mel-Frequency cepstral coefficients. Additionally, the acoustic feature prediction network includes a spectral masking engine to guide the prediction of the set of values for Mel-Frequency cepstral coefficients.

As illustrated in FIG. 5, the acoustic feature prediction network 504 includes a spectral masking engine 506. The spectral masking engine 506 can receive input audio data and identify audio frequencies of the input audio data that have an audio characteristic that reduces the quality of the input audio data from studio quality (e.g., noise, distortion, etc.). The spectral masking engine 506 generates a spectral mask from the input audio data. As described above, the spectral masking engine 506 generates a non-negative mask to remove or reduce energy of undesired audio characteristics.

As illustrated in FIG. 5, the audio enhancement system 500 includes generative audio model 508. The generative audio model 508 receives input audio data and a predicted set of acoustic features. The generative audio model 508 generates audio waveforms that correspond to studio quality perceptual sound using the input audio data and the predicted set of acoustic features.

As illustrated in FIG. 5, the audio enhancement system 500 also includes training manager 510. The training manager 510 can teach, guide, tune, and/or train one or more neural networks. In particular, the training manager 510 can train a neural network based on a plurality of training data (e.g., training data 520). As discussed, the training data 520 may include studio quality audio, such as from a library of recordings or other source. In some embodiments, to more closely replicate the data that will be seen at test time, the training data 520 may include training sets of acoustic features such as Mel-frequency cepstral coefficients that when processed by a generative audio model, generate studio quality audio data, as discussed above. More specifically, the training manager 510 can access, identify, generate, create, and/or determine training input and utilize the training input to train and fine-tune a neural network. For instance, the training manager 510 can train the acoustic feature prediction network 504 or generative audio model 508, as discussed above.

As illustrated in FIG. 5, the audio enhancement system 500 also includes a neural network manager 514. Neural network manager 514 may host a plurality of neural networks or other machine learning models, such as acoustic feature prediction network 108 or generative audio model 112 of FIG. 1. The neural network manager 514 may include an execution environment, libraries, and/or any other data needed to execute the machine learning models. In some embodiments, the neural network manager 514 may be associated with dedicated software and/or hardware resources to execute the machine learning models. As discussed, acoustic feature prediction network 504 can be implemented as any trained model (e.g., a transformer model) and generative audio model 508 can be implemented as any generator network, such as HiFi-GAN, or other generators. In various embodiments, each acoustic feature prediction network 504 or generative audio model 508 hosted by neural network manager 514 may be hosted by a single neural network manager 514. In some embodiments, the neural networks may be hosted in multiple neural network managers and/or as part of different components. For example, the acoustic feature prediction network 504 or generative audio model 508 can be hosted by their own neural network manager, or other host environment, in which the respective neural networks execute, or may be spread across multiple neural network managers depending on, e.g., the resource requirements of each machine learning model, etc.

As illustrated in FIG. 5, the audio enhancement system 500 also includes a high fidelity audio super resolution engine 516 that applies a high-fidelity audio super resolution engine 118 to generate wideband audio data (e.g., 44 kHz or higher) from narrowband audio data produced by the generative audio model 508 (e.g., less than 44 kHz audio data). To implement the high-fidelity audio super resolution engine 118, the audio enhancement system 100 can use a generative adversarial network (GAN) to perform bandwidth extension (BWE) to extend the input speech from, e.g., 16 kHz to 48 kHz, such that the result is typically indistinguishable from real full bandwidth recordings.

As illustrated in FIG. 5, the audio enhancement system 500 also includes the storage manager 512. The storage manager 512 maintains data for the audio enhancement system 500. The storage manager 512 can maintain data of any type, size, or kind as necessary to perform the functions of the audio enhancement system 500. The storage manager 512, as shown in FIG. 5, includes the input audio data 518. The input audio data 518 can include a plurality of audio data that each include perceptual characteristics that reduce the quality of the input audio data, as discussed in additional detail above. In particular, in one or more embodiments, the input audio data 518 includes a selected input audio data received from the user via the user interface manager 502.

As further illustrated in FIG. 5, the storage manager 512 also includes training data 520. Training data 520 can include information used to train the acoustic feature prediction network 504 and/or generative audio model 508 used by the audio enhancement system 500. Training data 520 includes studio quality acoustic features, training input audio data, and sets of acoustic features from studio quality audio data.

As further illustrated in FIG. 5, the storage manager 512 also includes acoustic feature data 522. The acoustic feature data 522 may include multiple sets of Mel-frequency cepstral coefficients that correspond to input audio data or studio quality audio data or a combination thereof. For instance, the audio enhancement system 500 can store acoustic feature data for added processing or for future augmenting of training data 520.

As further illustrated in FIG. 5, the storage manager 512 also includes studio quality audio data 524. The studio quality audio data 524 are audio data that are recorded and professionally at a sample rate ≥44.1 kHz or audio that is perceptually indistinguishable using MOS. The studio quality audio data 524 can include studio quality audio data used for generating the studio quality audio features for training the acoustic feature prediction network 504 and/or the studio quality audio data that are output from the generative audio model 508.

Each of the components 502-512 of the audio enhancement system 500 and their corresponding elements (as shown in FIG. 5) may be in communication with one another using any suitable communication technologies. It will be recognized that although components 502-512 and their corresponding elements are shown to be separate in FIG. 5, any of components 502-512 and their corresponding elements may be combined into fewer components, such as into a single facility or module, divided into more components, or configured into different components that may serve a particular embodiment.

The components 502-512 and their corresponding elements can comprise software, hardware, or both. For example, the components 502-512 and their corresponding elements can comprise one or more instructions stored on a computer-readable storage medium and executable by processors of one or more computing devices. When executed by the one or more processors, the computer-executable instructions of the audio enhancement system 500 can cause a client device and/or a server device to perform the methods described herein. Alternatively, the components 502-512 and their corresponding elements can comprise hardware, such as a special purpose processing device to perform a certain function or group of functions. Additionally, the components 502-512 and their corresponding elements can comprise a combination of computer-executable instructions and hardware.

Furthermore, the components 502-512 of the audio enhancement system 500 may, for example, can be implemented as one or more stand-alone applications, as one or more modules of an application, as one or more plug-ins, as one or more library functions or functions that may be called by other applications, and/or as a cloud-computing model. Thus, the components 502-512 of the audio enhancement system 500 may be implemented as a stand-alone application, such as a desktop or mobile application. Furthermore, the components 502-512 of the audio enhancement system 500 may be implemented as one or more web-based applications hosted on a remote server. Alternatively, or additionally, the components of the audio enhancement system 500 may be implemented in a suit of mobile device applications or "apps."

Figure 6:
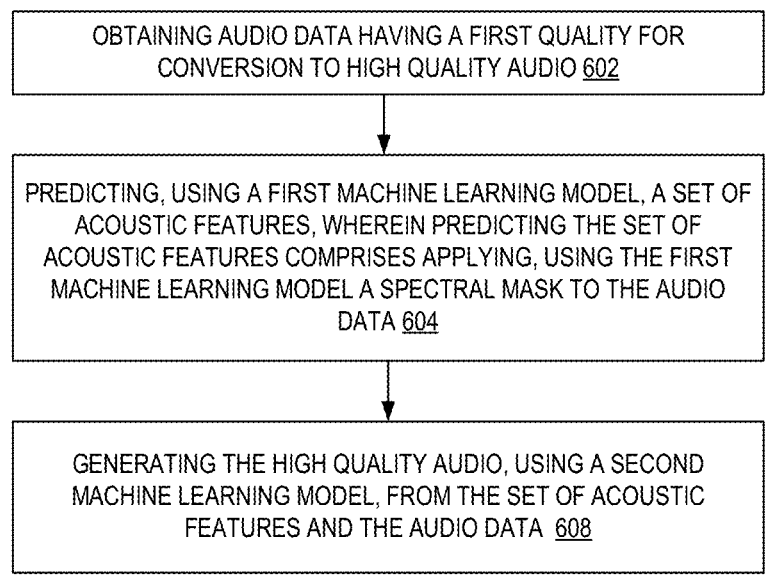
FIG. 6 illustrates a flowchart of a series of acts in a method of generating studio quality audio from an audio data with a first quality in accordance with one or more embodiments.

FIGS. 1-5, the corresponding text, and the examples, provide a number of different systems and devices that allows a user to generate studio quality audio from an audio data with a first quality. In addition to the foregoing, embodiments can also be described in terms of flowcharts comprising acts and steps in a method for accomplishing a particular result. For example, FIGS. 6 and 7 illustrate flowcharts of exemplary methods in accordance with one or more embodiments. The methods described in relation to FIGS. 6 and 7 may be performed with fewer or more steps/acts or the steps/acts may be performed in differing orders. Additionally, the steps/acts described herein may be repeated or performed in parallel with one another or in parallel with different instances of the same or similar steps/acts. FIG. 6 illustrates a flowchart of a series of acts in a method of generating studio quality audio from an audio data with a first quality in accordance with one or more embodiments. In one or more embodiments, the method 600 is performed in a digital medium environment that includes the audio enhancement system 500. The method 600 is intended to be illustrative of one or more methods in accordance with the present disclosure and is not intended to limit potential embodiments. Alternative embodiments can include additional, fewer, or different steps than those articulated in FIG. 6.

As illustrated in FIG. 6, the method 600 includes an act 602 of obtaining an audio data having a first quality for conversion to high quality audio. As described above, the acoustic feature prediction network receives an audio data identified by the input audio data selection via a user interface. The input audio data selection identifies a noisy input audio data that is selected for conversion to a studio quality audio data. As discussed, the conversion may be made from lower quality audio data to high quality audio or studio quality audio.

As illustrated in FIG. 6, the method 600 includes an act 604 of predicting, using a first machine learning model, a set of acoustic features, wherein predicting the set of acoustic features comprises applying, using the first machine learning model a spectral mask to the audio data. As described above, the acoustic feature prediction network is a trained machine learning model that generates a prediction including a set of acoustic features from the input audio data. The set of acoustic features includes a Mel-spectrogram with at least one Mel bin for a studio quality version of the input audio data. In some embodiments, predicting the set of acoustic features includes predicting a set of 18-coefficient Mel-frequency cepstral coefficients (MFCCs) from a set of 80-bin Mel-spectrogram of the audio data that produces a studio quality audio data.

In some embodiments, the first machine learning model is trained by receiving a collection of training data including training studio quality audio data, training input audio data, and a set of training acoustic features and training the first machine learning model using the collection of training data including training studio quality audio data, training input audio data, and a training set of studio quality acoustic features to generate a predicted set of acoustic features.

In some embodiments, the prediction of the set of acoustic features includes applying a spectral mask to the set of acoustic features. As described above, spectral masking reduces a magnitude of one or more frequencies associated with a noise feature, the noise feature representing a predicted degradation of a perceptual aspect of the audio data (e.g., masking mel bins that indicate noise features). In some embodiments, applying a spectral mask to the set of acoustic features further includes reducing a magnitude of one or more frequencies associated with a noise feature, the noise feature representing a predicted degradation of a perceptual aspect of the audio data.

As illustrated in FIG. 6, the method 600 includes an act 608 of generating the high quality audio, using a second machine learning model, from the set of acoustic features and the input audio. As described above, the machine learning model outputs the studio quality audio data. In some embodiments, the audio enhancement application outputs the studio quality audio data to an audio device of a user device. In some embodiments, the method 600 also includes outputting the studio quality audio to an audio device.

In some embodiments, the method 600 further includes retraining the first machine learning model or the second machine learning model. In some embodiments, such retraining may include augmenting a collection of training data including training studio quality audio data, training input audio data, and a set of training acoustic features to include additional training studio quality audio data, additional training input audio data, and additional sets of training acoustic features (e.g., additional training MFCCs or additional Mel-spectrograms) and training first machine learning model or the second machine learning model using the augmented collection of training data to generate studio quality audio for the input audio.

FIG. 7 illustrates a flowchart of a series of acts in a method of training an acoustic feature prediction network in accordance with one or more embodiments. In one or more embodiments, the method 700 is performed in a digital medium environment that includes the audio enhancement system 500. The method 700 is intended to be illustrative of one or more methods in accordance with the present disclosure and is not intended to limit potential embodiments. Alternative embodiments can include additional, fewer, or different steps than those articulated in FIG. 7.

As illustrated by FIG. 7, the method 700 includes an act 702 of receiving a collection of training data including training studio quality audio data, training input audio data and a set of training acoustic features. For example, the training manager receives a set studio quality audio data that includes multiple portions of studio quality audio data. The training studio quality audio data can be represented by a training set of Mel frequency cepstral coefficients. An example of the training set of Mel frequency cepstral coefficients is a set of Mel frequency cepstral coefficients that can be used by a generative audio model to produce studio quality audio data. The training input audio data can include consumer grade audio data with various degradations such as distortion, artifacts, or speaker ambiguity.

As illustrated by FIG. 7, the method 700 includes an act 704 of training a first machine learning model using the collection of training data including training studio quality audio data, training input audio data, and a set of training acoustic features to generate a set of acoustic features for the input audio data that represent a predicted set of acoustic features for studio quality audio. Using a training process similar to as described above with reference to FIG. 3, the training of the first machine learning model minimizes a difference between a Mel-frequency cepstral coefficient representing the studio quality audio data and corresponding Mel-frequency cepstral coefficients generated by the first machine learning model (e.g., the acoustic feature network as described above).

In some embodiments, the method 700 also includes training a second machine learning model using the collection of training data including training studio quality audio data, training input audio data, and a set of training acoustic features to generate studio quality audio from an input audio data. As described above, the second machine learning model can be a generative audio model such as a generative adversarial network (GAN). To train the GAN, a discriminator component learns to distinguish authentic studio quality audio data such as the training studio quality audio data from inauthentic target audios such as output audio data produced by a generator component. The generator component learns to generate progressively better output audio data (i.e., closer to the corresponding training studio quality audio data) based in part on feedback from the discriminator component. More specifically, during training, the generator component produces output audio data from the noisy input audio data and the training set of acoustic features, and the discriminator component guesses whether the output audio and/or training studio quality audio data is authentic. Training of the GAN can use any suitable process and/or loss functions for training GANs. After training, the GAN is able to generate a studio quality audio based on an input audio data and a set of predicted acoustic features from the first machine learning model (e.g., acoustic feature prediction network 108).

In some embodiments, the method 700 also includes augmenting the collection of training data to include additional training studio quality audio data, additional training input audio data, and an additional set of training acoustic features, wherein the additional training studio quality audio data are generated by the second machine learning model and the additional set of training acoustic features are generated by the first machine learning model. After deployment to the audio enhancement system, the first machine learning model (e.g., the acoustic feature prediction network 108) can produce predicted sets of acoustic features and the generative audio model provides studio quality audio data. The predicted sets of acoustic features and the generative audio model provides studio quality audio data can be used to augment the training data.

In some embodiments, the method 700 also includes re-training the first machine learning model or the second machine learning model using the augmented collection of training data to generate studio quality audio from an additional input audio data. In some embodiments, the training manager performs retraining on the generative audio model 112 using additional studio quality output files generated by the audio enhancement system. The additional studio quality audio data is generated by converting input audio data to studio quality output audio as described above. After augmenting the training data as described at operation 408, the training manager retrains the first machine learning model or the second machine learning model using the collection of training data including augmented training studio quality audio data, augmented training input audio data, and an augmented set of training acoustic features to generate studio quality audio for input audio data.

Figure 8:
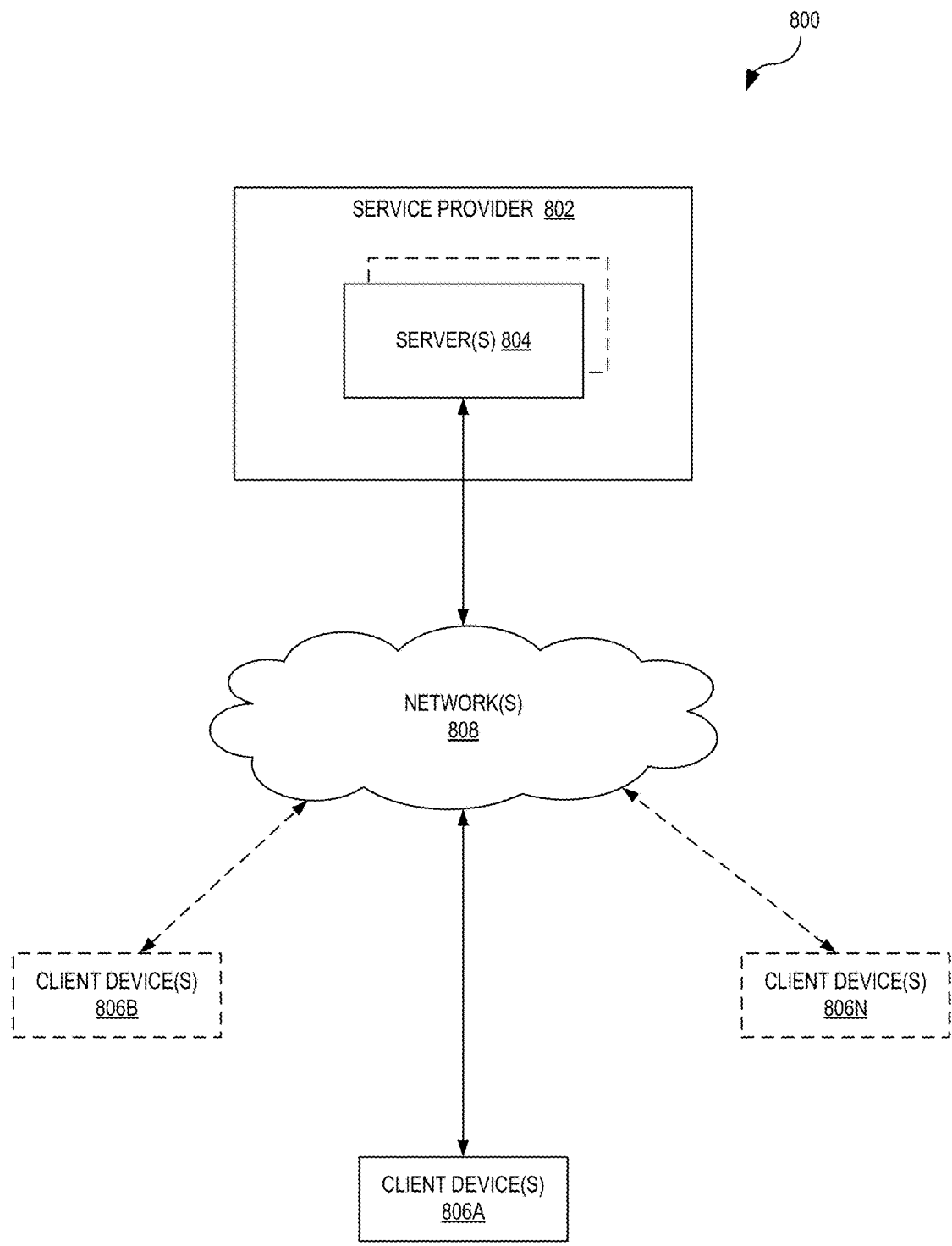
FIG. 8 illustrates a schematic diagram of an exemplary environment in which the audio enhancement system can operate in accordance with one or more embodiments.

FIG. 8 illustrates a schematic diagram of an exemplary environment 800 in which the audio enhancement system 500 can operate in accordance with one or more embodiments. In one or more embodiments, the environment 800 includes a service provider 802 which may include one or more servers 804 connected to a plurality of client devices 806A-806N via one or more networks 808. The client devices 806A-806N, the one or more networks 808, the service provider 802, and the one or more servers 804 may communicate with each other or other components using any communication suitable for transporting data and/or communication signals, including any known communication technologies, devices, media, and protocols supportive of remote data communications, examples of which will be described in more detail below with respect to FIG. 9.

Although FIG. 8 illustrates a particular arrangement of the client devices 806A-806N, the one or more networks 808, the service provider 802, and the one or more servers 804, various additional arrangements are possible. For example, the client devices 806A-806N may directly communicate with the one or more servers 804, bypassing the network 808. Or alternatively, the client devices 806A-806N may directly communicate with each other. The service provider 802 may be a public cloud service provider which owns and operates their own infrastructure in one or more data centers and provides this infrastructure to customers and end users on demand to host applications on the one or more servers 804. The servers may include one or more hardware servers (e.g., hosts), each with its own computing resources (e.g., processors, memory, disk space, networking bandwidth, etc.) which may be securely divided between multiple customers, each of which may host their own applications on the one or more servers 804. In some embodiments, the service provider may be a private cloud provider which maintains cloud infrastructure for a single organization. The one or more servers 804 may similarly include one or more hardware servers, each with its own computing resources, which are divided among applications hosted by the one or more servers for use by members of the organization or their customers.

Similarly, although the environment 800 of FIG. 8 is depicted as having various components, the environment 800 may have additional or alternative components. For example, the environment 800 can be implemented on a single computing device with the audio enhancement system 500. In particular, the audio enhancement system 500 may be implemented in whole or in part on the client device 806A.

As illustrated in FIG. 8, the environment 800 may include client devices 806A-806N. The client devices 806A-806N may comprise any computing device. For example, client devices 806A-806N may comprise one or more personal computers, laptop computers, mobile devices, mobile phones, tablets, special purpose computers, TVs, or other computing devices, including computing devices described below with regard to FIG. 9. Although three client devices are shown in FIG. 8, it will be appreciated that client devices 806A-806N may comprise any number of client devices (greater or smaller than shown).

Moreover, as illustrated in FIG. 8, the client devices 806A-806N and the one or more servers 804 may communicate via one or more networks 808. The one or more networks 808 may represent a single network or a collection of networks (such as the Internet, a corporate intranet, a virtual private network (VPN), a local area network (LAN), a wireless local network (WLAN), a cellular network, a wide area network (WAN), a metropolitan area network (MAN), or a combination of two or more such networks. Thus, the one or more networks 808 may be any suitable network over which the client devices 806A-806N may access service provider 802 and server 804, or vice versa. The one or more networks 808 will be discussed in more detail below with regard to FIG. 9.

In addition, the environment 800 may also include one or more servers 804. The one or more servers 804 may generate, store, receive, and transmit any type of data, including input audio data 618, training data 620, acoustic feature data 622, studio quality audio data 624, or other information. For example, a server 804 may receive data from a client device, such as the client device 806A, and send the data to another client device, such as the client device 802B and/or 802N. The server 804 can also transmit electronic messages between one or more users of the environment 800. In one example embodiment, the server 804 is a data server. The server 804 can also comprise a communication server or a web-hosting server. Additional details regarding the server 804 will be discussed below with respect to FIG. 9.

As mentioned, in one or more embodiments, the one or more servers 804 can include or implement at least a portion of the audio enhancement system 500. In particular, the audio enhancement system 500 can comprise an application running on the one or more servers 804 or a portion of the audio enhancement system 500 can be downloaded from the one or more servers 804. For example, the audio enhancement system 500 can include a web hosting application that allows the client devices 806A-806N to interact with content hosted at the one or more servers 804. To illustrate, in one or more embodiments of the environment 800, one or more client devices 806A-806N can access a webpage supported by the one or more servers 804. In particular, the client device 806A can run a web application (e.g., a web browser) to allow a user to access, view, and/or interact with a webpage or website hosted at the one or more servers 804.

Upon the client device 806A accessing a webpage or other web application hosted at the one or more servers 804, in one or more embodiments, the one or more servers 804 can provide access to input audio data, training data, acoustic feature data, or studio quality audio data (e.g., input audio data 618, training data 620, acoustic feature data 622, studio quality audio data 624, etc.) stored at the one or more servers 804. Moreover, the client device 806A can receive a request (i.e., via user input) to perform a conversion of an input audio data to a studio quality audio data and provide the request to the one or more servers 804. Upon receiving the request, the one or more servers 804 can automatically perform the methods and processes described above to generate the studio quality audio data. The one or more servers 804 can provide all or portions of the studio quality audio data, to the client device 806A for presentation to the user (e.g., play through a speaker, present a waveform visualization, etc.)

As just described, the audio enhancement system 500 may be implemented in whole, or in part, by the individual elements 802-808 of the environment 800. It will be appreciated that although certain components of the audio enhancement system 500 are described in the previous examples with regard to particular elements of the environment 800, various alternative implementations are possible. For instance, in one or more embodiments, the audio enhancement system 500 is implemented on any of the client devices 806A-806N. Similarly, in one or more embodiments, the audio enhancement system 500 may be implemented on the one or more servers 804. Moreover, different components and functions of the audio enhancement system 500 may be implemented separately among client devices 806A-806N, the one or more servers 804, and the network 808.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures that can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, that both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 9:
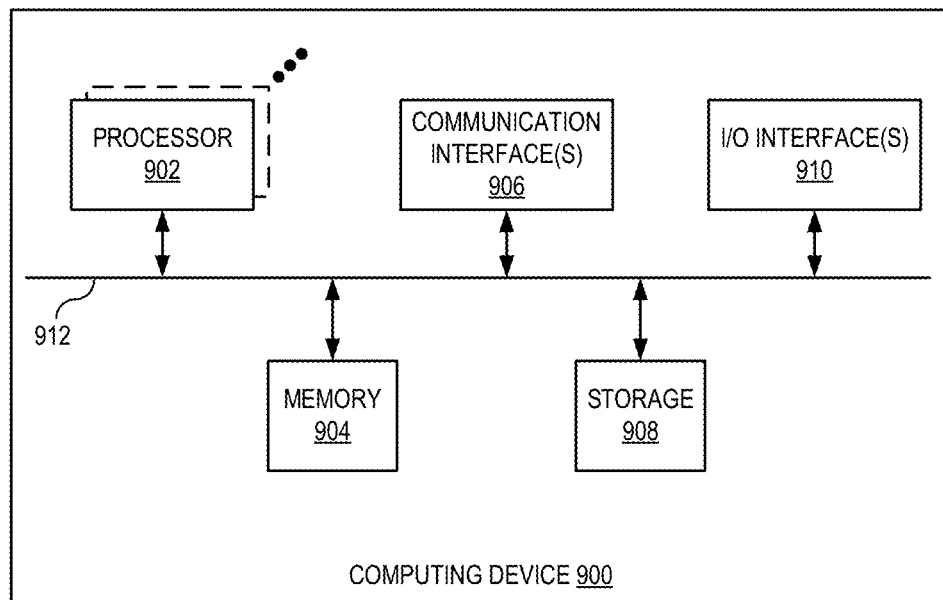
FIG. 9 illustrates a block diagram of an exemplary computing device in accordance with one or more embodiments.

FIG. 9 illustrates, in block diagram form, an exemplary computing device 900 that may be configured to perform one or more of the processes described above. One will appreciate that one or more computing devices such as the computing device 900 may implement the audio enhancement system 500. As shown by FIG. 9, the computing device can comprise a processor 902, memory 904, one or more communication interfaces 906, a storage device 908, and one or more I/O devices/interfaces 910. In certain embodiments, the computing device 900 can include fewer or more components than those shown in FIG. 9. Components of computing device 900 shown in FIG. 9 will now be described in additional detail.

In particular embodiments, processor(s) 902 includes hardware for executing instructions, such as those making up a computer program. As an example, and not by way of limitation, to execute instructions, processor(s) 902 may retrieve (or fetch) the instructions from an internal register, an internal cache, memory 904, or a storage device 908 and decode and execute them. In various embodiments, the processor(s) 902 may include one or more central processing units (CPUs), graphics processing units (GPUs), field programmable gate arrays (FPGAs), systems on chip (SoC), or other processor(s) or combinations of processors.

The computing device 900 includes memory 904, which is coupled to the processor(s) 902. The memory 904 may be used for storing data, metadata, and programs for execution by the processor(s). The memory 904 may include one or more of volatile and non-volatile memories, such as Random Access Memory ("RAM"), Read Only Memory ("ROM"), a solid-state disk ("SSD"), Flash, Phase Change Memory ("PCM"), or other types of data storage. The memory 904 may be internal or distributed memory.

The computing device 900 can further include one or more communication interfaces 906. A communication interface 906 can include hardware, software, or both. The communication interface 906 can provide one or more interfaces for communication (such as, for example, packet-based communication) between the computing device and one or more other computing devices 900 or one or more networks. As an example, and not by way of limitation, communication interface 906 may include a network interface controller (NIC) or network adapter for communicating with an Ethernet or other wire-based network or a wireless NIC (WNIC) or wireless adapter for communicating with a wireless network, such as a WI-FI. The computing device 900 can further include a bus 912. The bus 912 can comprise hardware, software, or both that couples components of computing device 900 to each other.

The computing device 900 includes a storage device 908 which includes storage for storing data or instructions. As an example, and not by way of limitation, storage device 908 can comprise a non-transitory storage medium described above. The storage device 908 may include a hard disk drive (HDD), flash memory, a Universal Serial Bus (USB) drive or a combination of these or other storage devices. The computing device 900 also includes one or more input or output ("I/O") devices/interfaces 910, which are provided to allow a user to provide input to (such as user strokes), receive output from, and otherwise transfer data to and from the computing device 900. These I/O devices/interfaces 910 may include a mouse, keypad or a keyboard, a touch screen, camera, optical scanner, network interface, modem, other known I/O devices or a combination of such I/O devices/interfaces 910. The touch screen may be activated with a stylus or a finger.

The I/O devices/interfaces 910 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O devices/interfaces 910 is configured to provide graphical data to a display for presentation to a user. The graphical data may be representative of one or more graphical user interfaces and/or any other graphical content as may serve a particular implementation.

In the foregoing specification, embodiments have been described with reference to specific exemplary embodiments thereof. Various embodiments are described with reference to details discussed herein, and the accompanying drawings illustrate the various embodiments. The description above and drawings are illustrative of one or more embodiments and are not to be construed as limiting. Numerous specific details are described to provide a thorough understanding of various embodiments.

Embodiments may include other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

In the various embodiments described above, unless specifically noted otherwise, disjunctive language such as the phrase "at least one of A, B, or C," is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

We claim:

1. A method comprising:
 obtaining audio data having a first quality for conversion to high quality audio;
 predicting, using a first machine learning model, a set of acoustic features,
  wherein predicting the set of acoustic features comprises applying, using
  the first machine learning model a spectral mask to the audio data;
 generating the high quality audio, using a second machine learning model, from the set of acoustic features and the audio data;
 augmenting a collection of training data to include additional training studio quality audio data generated by the second machine learning model and additional training acoustic features generated by the first machine learning model; and
 retraining the first machine learning model using the augmented collection of training data to generate a predicted set of acoustic features that represent studio quality of the audio data.

2. The method of claim 1, wherein the first machine learning model is trained by:
 receiving a first collection of training data including first training studio quality audio data, first training input audio data, and a first set of training acoustic features; and
 training the first machine learning model using the first collection of training data to generate a predicted set of acoustic features that represent studio quality of the audio data.

3. The method of claim 1, wherein the second machine learning model is trained by:
 receiving a second collection of training data including second training studio quality audio data, second training input audio data, and a second set of training acoustic features; and
 training the second machine learning model using the second collection of training data to generate studio quality audio for the audio data.

4. The method of claim 1,
 wherein the collection of training data includes training studio quality audio data, training input audio data, and a set of training acoustic features, and wherein the augmented collection of training data further includes additional training input audio data.

5. The method of claim 1, further comprising retraining the second machine learning model, the retraining comprising:
augmenting a collection of training data including training studio quality audio data, training input audio data, and a set of training acoustic features to include additional training studio quality audio data, additional training input audio data, and additional sets of training acoustic features, wherein the additional training studio quality audio data are generated by the second machine learning model, and the additional set of training acoustic features are generated by the first machine learning model; and
training the second machine learning model using the augmented collection of training data to generate studio quality audio for the audio data.

6. The method of claim 1, wherein applying a spectral mask to the set of acoustic features comprises reducing a magnitude of one or more frequencies associated with a noise feature, the noise feature representing a predicted degradation of a perceptual aspect of the audio data.

7. The method of claim 1, wherein predicting, using a first machine learning model, a set of acoustic features comprises:
predicting a set of 18-coefficient Mel-frequency cepstral coefficients (MFCCs) from a set of 80-bin Mel-spectrogram of the audio data that produces a studio quality audio data.

8. The method of claim 1, wherein the high quality audio comprises studio quality audio.

9. A system comprising:
a memory component; and
a processing device coupled to the memory component, the processing device to perform operations comprising:
obtaining audio data having a first quality for conversion to high quality audio;
predicting, using a first machine learning model, a set of acoustic features, wherein predicting the set of acoustic features comprises applying, using the first machine learning model, a spectral mask to the audio data;
generating the high quality audio, using a second machine learning model, from the set of acoustic features and the audio data;
augmenting a collection of training data to include additional training studio quality audio data generated by the second machine learning model and additional training acoustic features generated by the first machine learning model; and
retraining the first machine learning model using the augmented collection of training data to generate a predicted set of acoustic features that represent studio quality of the audio data.

10. The system of claim 9, wherein the first machine learning model is trained by performing operations comprising:
receiving a first collection of training data including first training studio quality audio data, first training input audio data, and a first set of training acoustic features; and
training the first machine learning model using the first collection of training data to generate a predicted set of acoustic features that represent studio quality of the audio data.

11. The system of claim 9, wherein the second machine learning model is trained by performing operations comprising:
receiving a second collection of training data including second training studio quality audio data, second training input audio data, and a second set of training acoustic features; and
training the second machine learning model using the second collection of training data to generate studio quality audio for the audio data.

12. The system of claim 9,
wherein the collection of training data includes training studio quality audio data, training input audio data, and a set of training acoustic features, and wherein the augmented collection of training data further includes additional training input audio data.

13. The system of claim 9, the operations further comprising retraining the second machine learning model, the retraining comprising:
augmenting a collection of training data including training studio quality audio data, training input audio data, and a set of training acoustic features to include additional training studio quality audio data, additional training input audio data, and additional sets of training acoustic features, wherein the additional training studio quality audio data are generated by the second machine learning model, and the additional set of training acoustic features are generated by the first machine learning model; and
training the second machine learning model using the augmented collection of training data to generate studio quality audio for the audio data.

14. The system of claim 9, wherein the operation of applying a spectral mask to the audio data causes operations comprising reducing a magnitude of one or more frequencies associated with a noise feature, the noise feature representing a predicted degradation of a perceptual aspect of the audio data.

15. The system of claim 9, wherein the operation of predicting, using the first machine learning model, the set of acoustic features causes operations comprising:
predicting a set of 18-coefficient Mel-frequency cepstral coefficients from a set of 80-bin Mel-spectrogram of the audio data that produces a studio quality audio data.

16. The system of claim 9, the operations further comprising outputting the studio quality audio to an audio device.

17. A non-transitory computer-readable medium storing executable instructions, which when executed by a processing device, cause the processing device to perform operations comprising:
receiving a first collection of training data including first training studio quality audio data, first training input audio data, and a first set of training acoustic features;
training a first machine learning model using the first collection of training data to generate a set of acoustic features for the input audio data that represent a predicted set of acoustic features for studio quality audio;
receiving a second collection of training data including second training studio quality audio data, second training input audio data, and a second set of training acoustic features;
training a second machine learning model using the second collection of training data to generate studio quality audio from an input audio data;
augmenting the first collection of training data to include additional training studio quality audio data generated by the second machine learning model and additional training acoustic features generated by the first machine learning model; and retraining the first machine learning model using the augmented first collection of training data to generate a set of acoustic features for the input audio data that represent a predicted set of acoustic features for studio quality audio.

18. The non-transitory computer-readable medium of claim 17,
wherein the first collection of training data includes additional training studio quality audio data, additional training input audio data, and an additional set of training acoustic features.

19. The non-transitory computer-readable medium of claim 17, the operations further comprising:
augmenting the collection of training data to include additional training studio quality audio data, additional training input audio data, and an additional set of training acoustic features, wherein the additional training studio quality audio data are generated by the second machine learning model, and the additional set of training acoustic features are generated by the first machine learning model; and
retraining the second machine learning model using the augmented collection of training data to generate studio quality audio for the audio data.

* * * * *